START-STOP LOGICAL SWITCHING SYSTEM

Filed Jan. 25, 1965 Sheet 1 of 2

INVENTOR.
JOHN C. McEVOY
BY
PAUL W. FISH.
AGENT.

INVENTOR.
JOHN C. McEVOY
BY
PAUL W. FISH.
AGENT.

United States Patent Office 3,428,830

Patented Feb. 18, 1969

3,428,830

START-STOP LOGICAL SWITCHING SYSTEM

John C. McEvoy, Livonia, Mich., assignor to Burroughs Corporation, Detroit, Mich., a corporation of Michigan Filed Jan. 25, 1965, Ser. No. 427,610

U.S. Cl. 307—247 7 Claims

Int. Cl. H03k *17/00*

This invention relates to high-speed item handling apparatus and, more particularly, to an improved, easily accessible, operator-actuated start-stop switching system for high-speed item handling apparatus.

Various high-speed item handling apparatus are well known in the art. Although the principles of applicant's invention are equally applicable to any item handling apparatus having an elongated operator-attended item transport mechanism, it will be described as applying to an item handling apparatus.

One example of an item sorter-reader is the Burroughs B–100 line of Magnetic Character Sorter-Readers. This apparatus is a precision electronic device that reads and sorts magnetically encoded documents at speeds upward of 1560 items per minute. The items to be sorted are previously encoded with magnetic indicia which provide signals to the sorter-reader for actuating the sorting operation. Such an apparatus comprises five fundamental units: the document feeder, the reader and recognition unit, the control panel, the transport and pocket mechanism, and the temporary storage area.

During the operation of the sorter-reader, the operator selects any one of a number of preprogrammed sorting patterns. The documents to be sorted are placed in the document feeder and, upon initiation of an operating cycle, are fed therefrom by appropriate transport means through the reader and recognition unit. In the reader and recognition unit, the encoded indicia are electronically read, thereby generating a first control signal. These signals, in combination with the control signals derived from the control panel, selectively activate the transport mechanism to deliver like items to predtermined pockets disposed along the transport mechanism.

For a more complete understanding of the magnetic character sorter-reader, reference may be had to Patent No. 3,052,350, issued Sept. 4, 1962, to M. W. Marcovitz, et al., and Patent No. 3,052,351, issued Sept. 4, 1962 to W. Hanstein, which are of common ownership with the assignee of the present invention.

One application for such a high-speed item sorter-reader is the handling of checks in a banking system. To fully utilize the capabilities of such an apparatus, it is desirable that the operation of continuous, that is, that the operator extract the sorted documents from the pocket mechanism while the apparatus continues to operate. It is often necessary for the operator to remove sorted items from pockets widely spaced along the length of the transport mechanism. The length of the transport mechanism and the number of pockets depend upon the needs of the particular user. The length of representative transport mechanisms may vary upward from 9 feet and it is, therefore, necessary for an operator to continuously move back and forth along the length of the transport mechanism during the operation to insure that the sorted items do not overfill a particular pocket.

Prior art sorter-readers have been equipped with a plurality of stop-start switches disposed along the length of the transport mechanism. If, for instance, the operator noticed a pocket was approaching an overfill condition, it was necessary to get to the closest "off" switch to avoid an overflow and then get to the closest "on" switch to resume the sorting operation. This often necessitated undue strains on the operator and resulted in decreased efficiency because the operator had to move back and forth along the length of the transport mechanism in order to reach the appropriate control switches.

While the time involved to reach the appropriate control switches may be only a fraction of a minute, it becomes increasingly important because the apparatus sorts upwards of 1560 items per minute. In continuous transit systems, such as those utilized in the Federal Reserve Banks, the number of items processed during a day may be greatly affected by the down-time occasioned by the cumulative time required for an operator to reach the appropriate control switches.

It is, therefore, the principal object of this invention to provide an improved and readily accessible control mechanism along substantially the entire length of an operator's station for high-speed item handling apparatus.

It is another object of the present invention to provide improved logical means for accurately controlling a high-speed item transport apparatus from a remote operator's station.

It is still another object of the present invention to provide an improved, operator controlled start-stop mechanism for high-speed item handling apparatus.

It is still another object of the present invention to provide an improved operator-controllable, start-stop mechanism for item handling apparatus which is both reliable in operation and reasonable in cost.

It is a further object of the present invention to increase the operating efficiency of operator-attended high-speed item handling apparatus.

Applicant has achieved the above listed and other desirable features by employing, in combination, an elongated actuating member extending along substantially the length of the operator's station, first and second functionally interrelated switching means, isolating means for eliminating the effect of switch contact bounce, and logical gating means responsive to the actuation of one of said switching means by the elongated member and the state of the apparatus to be controlled. Upon actuation of either or both of the switching means by the selective displacement of the elongated actuating member, a suitable signal is fed through the isolating means to the logical gating means. The logical gating means senses the state of the apparatus to be controlled, and, in response to the application of the switch generated signals, produces an appropriate signal to reverse the "off"-"on" state of the controlled apparatus.

The above listed objects and other aspects of applicant's invention will be further explained in the following detailed description and illustrated in the accompanying drawings with disclose, by way of example, the preferred embodiment of applicant's invention. For a more complete understanding of applicant's invention, reference may be had to be accompanying drawings in which.

Figure 1:
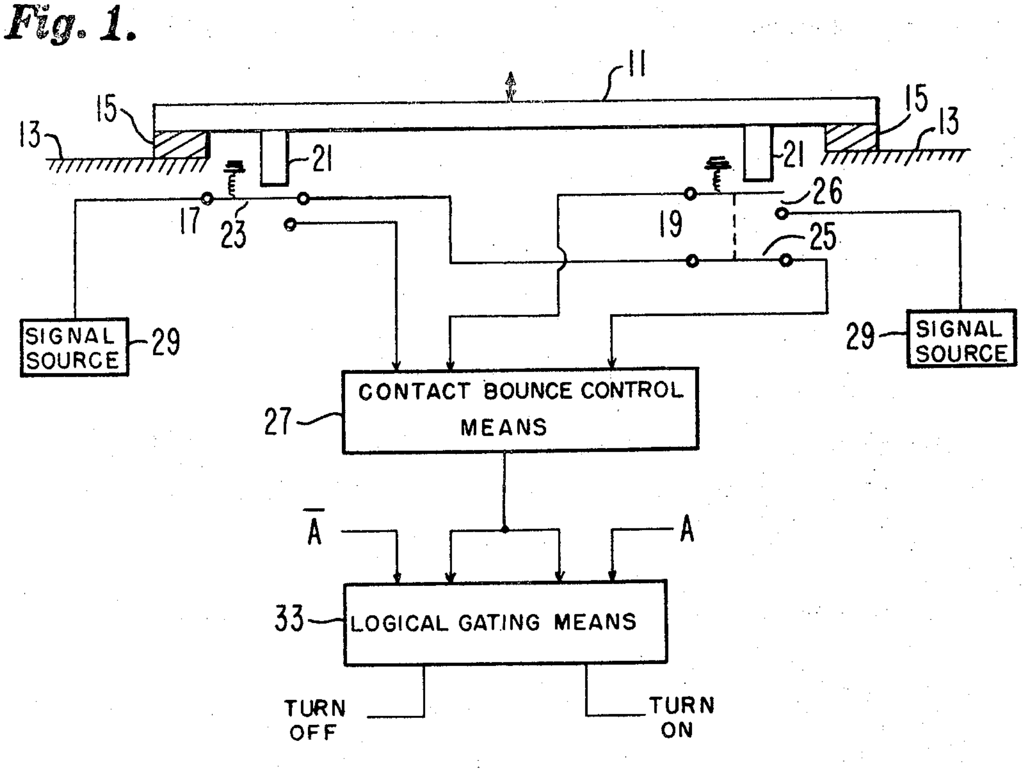
FIG. 1 is a block diagram of an auxiliary start-stop power control circuit embodying the principles of applicant's invention.

Referring now to FIG. 1, there is shown a block diagram of a remote start-stop power controlling switching system which embodies the principles of applicant's invention. An actuating bar member 11 is supported on a frame member 13 by suitable resilient means 15 which allows a displacement by an operator to move the actuating member toward the frame. The frame, for example, may comprise the face plate of the high-speed item handling apparatus or a portion of the floor adjacent the operator's station. The switching system is arranged such that the operator's actuation of bar 11 from any position therealong will reverse the operating state of the controlled apparatus. That is, if the apparatus is "on" and the operator actuates bar member 11, the machine will be turned "off," and vice versa. In order to insure accurate operation and ease of actuation, applicant utilizes two switches 17 and 19 with one being positioned proximate each end of the actuating bar 11. Depending from the bar 11 are appropriate actuating fingers 21 which are arranged to move the contacting arms 23, 25 and 26 of the respective switches against bias in response to the actuation of the bar.

It is necessary to control the actuation of the switches to insure that only one control signal is sent to the apparatus in response to a single actuation by the operator. Utilizing an elongated actuating member and a plurality of switches, it is possible that a single actuation will result in a sequential energization of the plurality of switches. To avoid multiple machine actuation or cycling in response to a single operator command, the switches are preferably functionally interrelated with contact bounce control means 27. The control means 27 in conjunction with the functionally interconnected switching means produces only one output in response to the actuation of the bar. Until both the switches return to the normal position, the control means 27 prevents the generation of another output signal.

When the operator wishes to reverse the operating state of the controlled apparatus, he actuates the push-push switching system by depressing elongated member 11. Switch actuating fingers 23, 25 and 26 thereupon actuate the switches to apply signals from appropriate sources 29 to the control means 27. As hereinafter to be more fully described, the control means 27 is arranged to give a single output for each actuation of a single switch or a sequential actuation of both switches in any order in response to a single depression of the actuating member 11. The output of the control means 27 is fed as one input of the logical gating means 33. Additional inputs to the logical gating means 33 comprise signals, for example, $\bar{A}$ and A, which represent the respective "on" and "off" operating states of the apparatus to be controlled.

The logical gating means, as hereinafter to be more fully described, may comprise any gating means known in the art which will generate a plurality of discrete outputs in response to the present operating state of the apparatus to be controlled and a signal from a bistable control means. The output of the gating means 33 is utilized to control actuating means, not shown, for reversing the operating state of the controlled apparatus.

Figure 2:
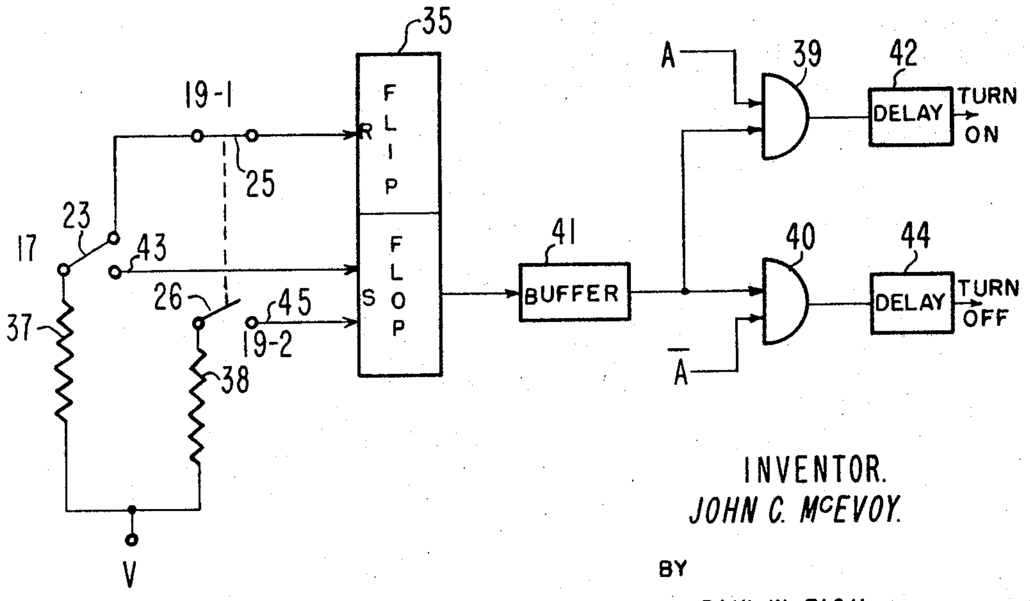
FIG. 2 is a logical diagram of a start-stop power control circuit embodying the principles of applicant's invention.

Referring now to FIG. 2, there is shown a logical diagram of a start-stop power controlling switching system which embodies the principles of applicant's invention. The switches 17 and 19 are arranged to be actuated from their normally biased state, as shown, to their actuated state in response to the actuation of an operating bar similar to that shown in FIG. 1. The set S and reset R inputs the flip-flop 35, and thereby the state of the flip-flop, are controlled by the positioning of the switches 17 and 19. The switches couple signals from, for example, an appropriate voltage source V via limiting resistors 37 and 38 to the respective inputs of flip-flop 35. The set output of flip-flop 35 is arranged to drive a pair of suitable AND gating means 39 and 40 through appropriate pulse responsive buffer means 41. The use of buffer 41 depends, as is well known in the art, upon the particular logic and signal levels utilized and effectively isolates the switching means 17, 19 from the gating means 39, 40. By utilizing a pulse responsive buffer, the time that the switching means are held closed does not control the output emanating from the delay means 42 and 44. The outputs of the respective gating means 39 and 40 are coupled to drive appropriate delay means 42 and 44 with the output of the respective delay means being connected to appropriate actuating means, not shown, for example, a relay for controlling the application of power to the controlled apparatus.

In operation, the flip-flop 35 is normally in the reset condition. The swinging arm 23 of switch 17 in its biased position applies a suitable signal from source V via resistor 37 and the normally closed portion 19–1 of switch 19 to the reset terminal R, to reset the flip-flop. However, as is known in the art, additional reset means could be utilized to insure that the flip-flop is initially in the reset state. The switching system is responsive to a control signal generated when flip-flop 35 is driven from the reset to the set state. In the reset state, no signal is fed to the buffer; therefore, the outputs of AND gates 39 and 40 remain high and thus no control signal appears at the output of either of the delay means 42 or 44.

Upon actuation of either or both of the switches 17 and 19, an appropriate signal is applied to the set input of flip-flop 35 via conductor 43 or 45, depending upon whether the single pulse transfer switch 17 or the mechanically interrelated single pole single throw switch 19 is actuated first. If switch 17 is actuated first, the swinging arm 23 of switch 17 contacts the normally open terminal connected to the end of conductor 43, thereby removing the source of signal potential V from the reset R side of the flip-flop and applying the source of signal potential to the "set" side via conductor 43. Through the normal cross coupling effect, the flip-flop changes state and when the switch 17 remains in the actuated position, flip-flop 35 remains in the set state. With flip-flop 35 in the set condition, a subsequent closing of switch 19 has no effect as it would merely tend to drive the flip-flop to the "set" state. When switch 17 is released to its bias, swinging arm 23 returns under bias to its normally closed position, as shown, thereby applying a source of potential V to the reset side of the flip-flop. This automatically resets flip-flop 35 and thus readies the switching system for another cycle of operation.

Alternatively, if switch 19 is actuated first then, as hereinafter to be more fully explained, since switch 19–1 opens before section 19–2 closes, the source of potential V is first removed from the reset side of flip-flop 35 before it is applied to the set side via resistor 38 and conductor 45. As is known in the art, application of the source V to the "set" side of the flip-flop triggers the flip-flop to the set state. Thus, while switch 19 remains in an actuated position, flip-flop 35 remains in the set condition. As before, with flip-flop 35 in the set state, actuation of the other switch, in this case switch 17, has no effect as it would merely tend to drive the flip-flop towards the set condition. Upon release of the switching mechanism to its bias, the swinging arms 25 and 26 of switch 19 return to their normal position as shown in FIG. 2, thereby removing the source of potential V from the set side and applying it to the reset side whereupon the flip-flop is triggered into the reset state, thus readying it for another cycle of operation. If either switch 17 or 19 is actuated independently, then the flip-flop 25 is triggered in the manner set forth above from the reset to the set condition and automatically resets when the independently actuated switch returns under bias to its normal position. In any event, either or both switches must return to their normal position before another switching cycle can begin.

In response to the change of state of the flip-flop from the reset condition to the set condition, an appropriate signal is delivered via the buffer 41 to the inputs of the AND gating means 39, 40 as shown in FIG. 2. The other inputs A and $\bar{A}$ of the AND gating means represent the respective "off" and "on" operating state of the apparatus to be controlled. Therefore, in response to the actuation of either or both switches 17 and 19 in any order and the corresponding change in state of flip-flop 35, one or the other of the AND gates 39 and 40 has both of the inputs "true" and thereupon an appropriate control signal generated by delay 42 or 44 associated with the activated gate to reverse the operating state of the apparatus to be controlled. Since the operating state of the apparatus to be controlled is utilized as one input to the logical AND gating means, it is desirable, in order to achieve reliable operation, that the time delay of delay means 42 and 44 be sufficient to allow the signal representing the present, i.e., prior to switch actuation, operating state to properly actuate the AND gating means.

As hereinbefore mentioned, it is desirable that the sections of switch 19 be sequentially operating. This is to insure that the actuation of either or both switches, in any order, will give only one output from the flip-flop. By interconnecting switches 17 and 19 as shown and by selecting section 19–1 of switch 19 to operate before section 19–2, reliable operation is insured. Utilizing this arrangement to set and reset the flip-flop, it is impossible to generate two signals from the flip-flop in response to the substantially simultaneous actuation of both switches in any order by the single operation of the actuating member by the operator. Further, the flip-flop is automatically reset to ready the switching system for another cycle of operation.

The individual elements of applicant's logical circuit are well known in the art. The flip-flop, for example, may comprise a direct coupled transistorized flip-flop. The buffer, AND gating means and delay means may be of any design well known in the art and may further be adapted to conform with any desired signal levels, the choice being dictated primarily by the design of the apparatus to be controlled. The logical gating means may comprise, for example, a multiple diode AND gate or a plurality of separately energizable resistors connected in parallel to the base electrode of a transistor wherein all inputs must be "true" before an output signal is developed. For example, if both inputs are low or one input is low and the other high, the output of the gate remains high, thereby requiring both inputs to be high before the output will go low. The buffer amplifier produces an output pulse of predetermined duration in response to a change in input level and, as embodied, in the system employed, comprises a pulse standardizer and inverter circuit. Similarly, the delay means may be a pulse standardizer of approximately the same delay period as the pulse standardizer of buffer 41, but could be a delay multivibrator device that produces an output pulse a given interval of time after the application thereto of an input pulse, which is of a duration less than the delay period of the device. See for example the form of pulse standardizer and DMV circuits disclosed in U.S. Patent 3,114,902. The delay elements 42 and 44 assure that the signal from 41 has expired prior to changing of the state of an output, TURN-ON or TURN-OFF, signal of FIG. 2. The logical functions of the circuit elements are well known in the art, and therefore will not be further explained herein. For a more complete understanding of the operation of and additional embodiments of logical circuits which may be utilized, reference may be had to Digital Computer Principles, McGraw-Hill Book Co., 1962.

Figure 3:
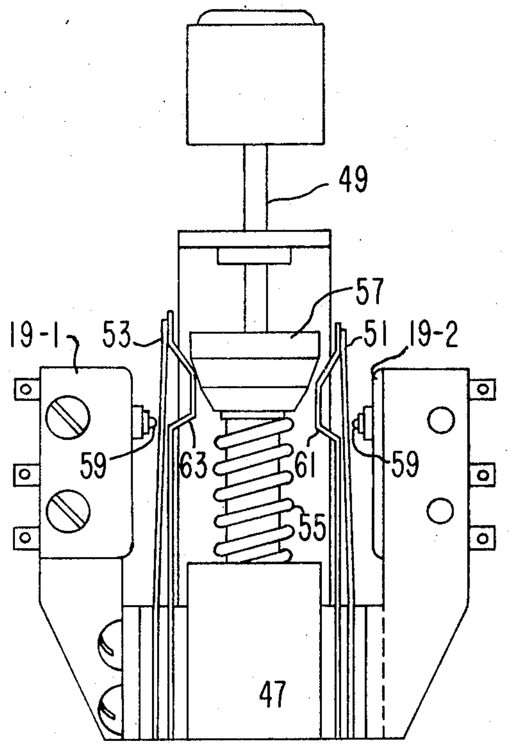
FIG. 3 is a plan view of the sequentially actuating switching mechanism utilizable in the switching circuitry illustrated in FIGS. 1 and 2.

In FIG. 3, there is shown a plan view of a sequentially actuating switching mechanism which is utilizable as switch 19 in FIGS. 1 and 2. As hereinabove stated, it is desirable to have one section of switch 19 operate before the other section to insure reliable operation of applicant's switching system. As shown in FIG. 3, this may be accomplished by utilizing a switching assembly comprising an apertured frame member 47 having first and second switches 19–1 and 19–2, a reciprocably supported common driving member 49 and two driven members 51 and 53 mounted thereon. The driving member is preferably normally biased outwardly by spring 55. The driving member carries a substantially frustroconical camming member 57. The switches may comprise the momentary contact micro type well known in the art, each having an actuating plunger 59. Driven members 51 and 53 have cam follower surfaces 61 and 63 thereon which are arranged to sequentially actuate the plunger members 59 of the respective switches in response to the depression of the driving member 49, which may for example be a push button type actuator.

By properly postioning the switches in relation to the driven members 51 and 53 and the camming member 57, either switch may be arranged to be actuated before the other switch. This switching mechanism is shown by way of example and may be obtained commercially from the Capitol Machine and Switch Company of Danbury, Conn. As would be evident to those skilled in the art, any mechanism designed to sequentially operate a plurality of functionally interrelated switching means, either mechanically or electrically, in a predetermined sequence could be utilized in practicing applicant's invention.

The foregoing drawings and descriptions are to be understood as exemplary only and are not intended in any way to limit the scope of applicant's invention which is set forth in the appended claims.

What is claimed is:

1. A push-push start-stop switching system for controlling an electric circuit in an apparatus as a function of the operating off-on state of the apparatus comprising:
- an elongated movably supported actuating member,
- a plurality of functionally interrelated switching means responsive to the movement of said actuating member in a predetermined direction,
- bistable control means responsive to the actuation of at least one of said switching means for generating a single output pulse, and
- logical gating means responsive to the off-on state of the apparatus and said output pulse from said control means for initiating the reversal of the off-on state of the apparatus.

2. The switching system defined in claim 1 wherein said plurality of switching means comprises a first momentary contact transfer switching means and a second multiple section operationally interrelated momentary contact switching means, one of said switching means being positioned proximate each end of said actuating member.

3. The switching system defined in claim 2 wherein said first switching means comprises a single-pole transfer switch having an open section and a normally closed section and wherein said second switching means comprises a pair of sequentially operable single-pole, single-throw switches, one of said pair being normally open and the other being normally closed.

4. The switching system defined in claim 3 additionally including circuit means for electrically connecting the normally closed section of said single-pole transfer switch and the normally closed single-pole, single-throw switch in series and wherein said normally closed single-pole, single-throw switch is constrained to open before said normally open single-pole, single-throw switch closes.

5. The switching system defined in claim 2 additionally including means driven by the output of said logical gating means for delaying for a predetermined time the reversal of the off-on state of the apparatus.

6. In an electrical circuit for controlling the application of electrical power to an apparatus as a function of the off-on operating state of the apparatus, the combination comprising:
- an elongated movably supported actuating bar,
- a bistable flip-flop having at least one set input terminal, at least one reset input terminal, and a set output terminal,
- first switching means including a single-pole transfer switch having a biased swinging arm and an open position and a normally closed position,
- second switching means including a pair of sequentially operating single-pole, single-throw switches, one of said being normally open and the other being normally closed,
- first circuit means for coupling the normally closed position of said first swithing means to the pole of said normally closed switch of said second switching means, second circuit means for coupling said normally closed switch of said second switching means to said reset terminal of said flip-flop, third circuit means for individually coupling the normally open sections of said first and second switching means to said set input terminal, fourth circuit means for applying a source of signal potential to said arm of said first switching means and to the pole of said normally open switch of said second switching means, a pair of two input logical AND gates, fifth circuit means for coupling said set output terminal of said flip-flop to one input of each of said pair of AND gates, sixth circuit means for applying signals to the other inputs of said AND gates representative of the respective off-on state of the apparatus to be controlled, a pair of delay elements individually coupled to the outputs of said AND gates, and means responsive to an output from either of said delay elements for controlling the application of power to said apparatus whereby the actuation of either or both of said first and second switching means initiates the reversal of the off-on state of the apparatus.

7. A switch actuated control circuit for automatically cycling a bistable cross-coupled flip-flop having at least one set input terminal and at least one reset input terminal comprising:

a single-pole transfer switch having a biased contact arm and an open and a normally closed switching position, a pair of sequentially operating single-pole, single-throw switches, one of said pair being normally open and the other being normally closed, first circuit means for coupling said normally closed single-pole, single-throw switch to said reset input terminal, second circuit means for coupling said normally closed position of said transfer switch to said pole of said normally closed single-pole, single-throw switch, third circuit means for individually coupling said normally open position of said single-pole transfer switch, and said normally open single-pole, single-throw switch to said set input terminal, fourth circuit means for applying a source of signal potential to said arm of said single-pole transfer switch and to said pole of said normally open single-pole, single-throw switch, and mechanical actuating means for actuating said switches either individually or in substantially simultaneous sequence whereby the actuation and release of said actuating means triggers said flip-flop from the reset state to the set state and back to the reset state.

References Cited

UNITED STATES PATENTS

| | | | |
|---|---|---|---|
| 2,748,229 | 5/1956 | Block | 200—153.19 |
| 2,860,212 | 11/1958 | Stearn | 200—159 |
| 3,069,562 | 12/1962 | Steele | 307—218 |
| 3,324,306 | 6/1967 | Lockwood | 307—247 |

ARTHUR GAUSS, *Primary Examiner.*

R. H. PLOTKIN, *Assistant Examiner.*

U.S. Cl. X.R.

307—218, 287; 200—159, 153.19, 152.12; 328—196, 206

UNITED STATES PATENT OFFICE
CERTIFICATE OF CORRECTION

February 18, 1969

Patent No. 3,428,830

John C. McEvoy

It is certified that error appears in the above identified patent and that said Letters Patent are hereby corrected as shown below:

Column 1, line 19, "item handling apparatus" should read -- sorter-reader --; line 41, "predtermined" should read -- predetermined --; line 52, "of" should read -- be --. Column 2, line 51, "with" should read -- which --; line 54, "be", second occurrence, should read -- the --. Column 4, line 75, before "generated" insert -- is --. Column 6, line 75, "switihing" should read -- switching --.

Signed and sealed this 31st day of March 1970.

(SEAL)
Attest:

Edward M. Fletcher, Jr.
Attesting Officer

WILLIAM E. SCHUYLER, JR.
Commissioner of Patents